Oct. 21, 1952      W. A. BIERMANN      2,614,577
VISCOSITY COMPENSATING LIQUID CONTROL DEVICE
Filed Feb. 28, 1946      3 Sheets-Sheet 1
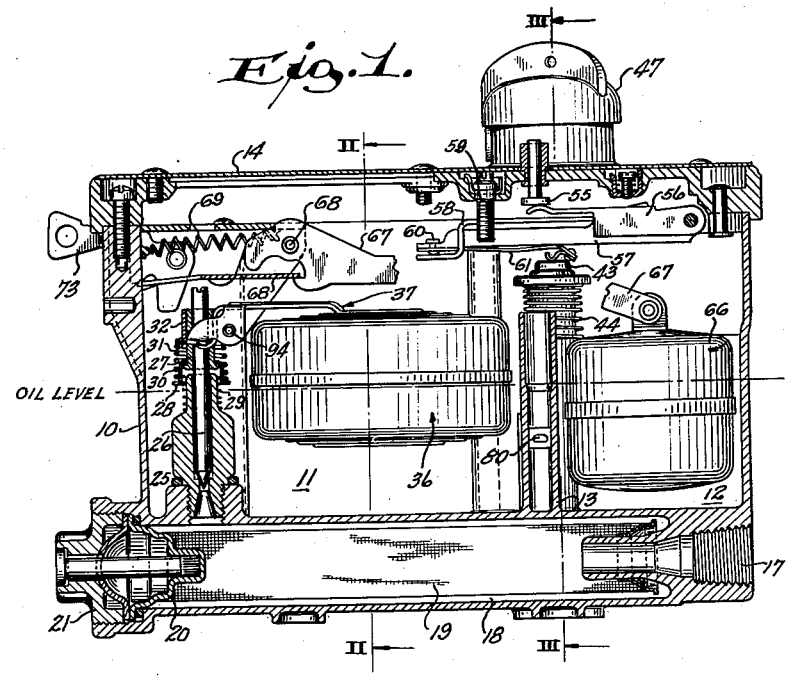
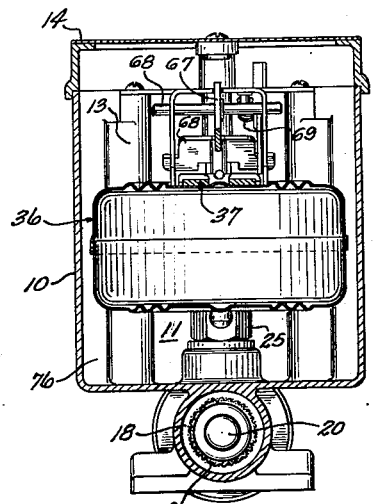
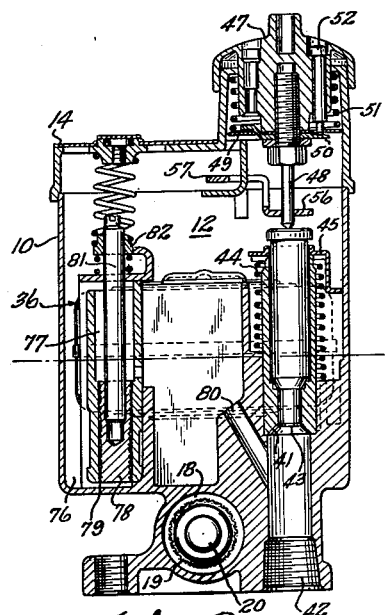
INVENTOR.
WILLIAM A. BIERMANN
BY John W. Michael
ATTORNEY.

Oct. 21, 1952 W. A. BIERMANN 2,614,577
VISCOSITY COMPENSATING LIQUID CONTROL DEVICE
Filed Feb. 28, 1946 3 Sheets-Sheet 2
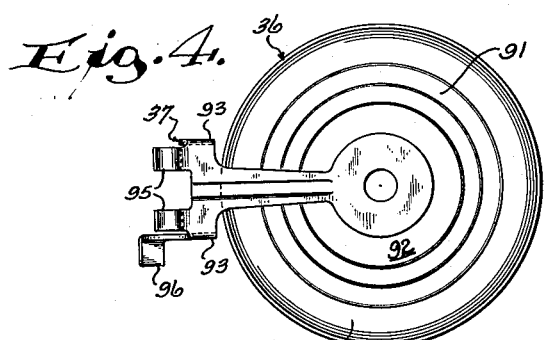
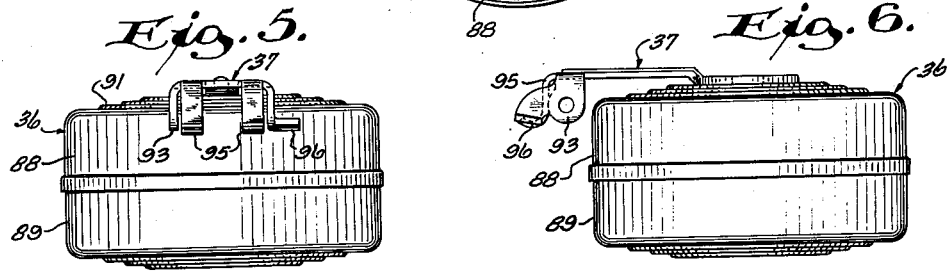
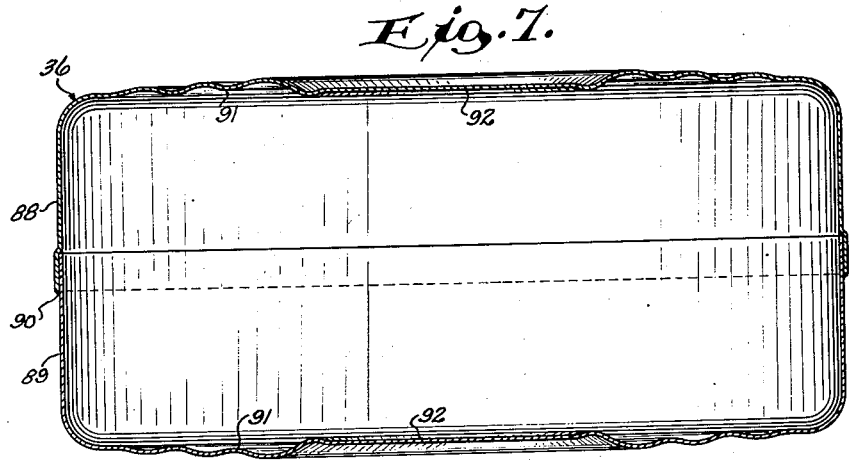
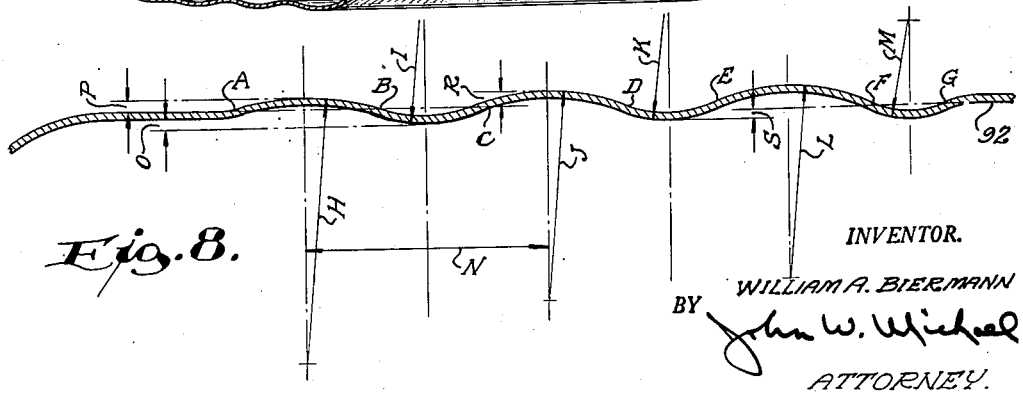
INVENTOR.
WILLIAM A. BIERMANN
BY John W. Michael
ATTORNEY.

Oct. 21, 1952 W. A. BIERMANN 2,614,577
VISCOSITY COMPENSATING LIQUID CONTROL DEVICE
Filed Feb. 28, 1946 3 Sheets-Sheet 3

INVENTOR.
WILLIAM A. BIERMANN
BY John W. Michael
ATTORNEY.

Patented Oct. 21, 1952

2,614,577

UNITED STATES PATENT OFFICE 2,614,577

VISCOSITY COMPENSATING LIQUID CONTROL DEVICE

William A. Biermann, Milwaukee, Wis., assignor to A P Controls Corporation, a corporation of Wisconsin Application February 28, 1946, Serial No. 650,982

5 Claims. (Cl. 137—389)

This invention relates to improvements in liquid flow control devices of the type in which the quantity of liquid flowing through the device depends on the liquid level maintained in the device, and particularly to devices in which the flow is to be kept substantially constant regardless of temperature variations of the liquid.

In the following description, the terms "flow variation" and "viscosity change" are considered as applying to variations and changes resulting from a change in temperature and not a change in composition of the liquid. Hence, when the present device is employed to control the flow of liquid fuel, it will be understood that density and viscosity changes resulting from temperature variations are compensated and that the present structure is not intended to compensate for variations in composition which may give wide viscosity ranges, the viscosity in a No. 1 fuel oil giving a kinematic viscosity varying from 1.546 to 1.800 centistokes at 100° F.

It is therefore one object of the present invention to supply a liquid flow control device which compensates for temperature variations in the liquid flowing through the device or in the temperature about the device.

Another object of the invention is to provide a liquid flow control device in which a substantially constant quantity of liquid is passed through a given orifice regardless of variations in the viscosity of the liquid.

Another object of the invention is to provide a liquid flow control device in which an element of the liquid level control means is itself formed to compensate for flow variations in the liquid of which the flow is to be controlled.

A further object of the invention is to provide a liquid flow control device in which variations in the liquid level maintained therein are automatically produced responsive to changes in the temperature of the liquid, thereby varying the static hydraulic head of the liquid on a discharge orifice as the viscosity of the liquid varies.

And a further object of the invention is to provide a liquid flow control device in which the buoyancy of a member, floating in the liquid of which the flow is to be controlled, is varied as the viscosity of the liquid varies with temperature to thereby vary the liquid level maintained within the device and secure discharge of a given quantity of liquid from the device regardless of changes in the temperature of the liquid.

Objects and advantages other than those above set forth will be apparent from the following description when read in connection with the accompanying drawings, in which:

Fig. 1 is a vertical longitudinal section on substantially a central plane through a device embodying the present invention;

Fig. 2 is a vertical transverse section taken on the plane of the line II—II of Fig. 1;

Fig. 3 is a vertical transverse section taken on the plane of the line III—III of Fig. 1;

Fig. 4 is a top plan view of a float of variable volume and of the arm connecting such float to other portions of the device;

Fig. 5 is a front elevation of the float and the arm;

Fig. 6 is a side elevation of the float and the arm;

Fig. 7 is an enlarged section of the float taken on a diametrical plane therethrough;

Fig. 8 is an enlarged fragment of the corrugated portions of the float wall;

Figure 9:
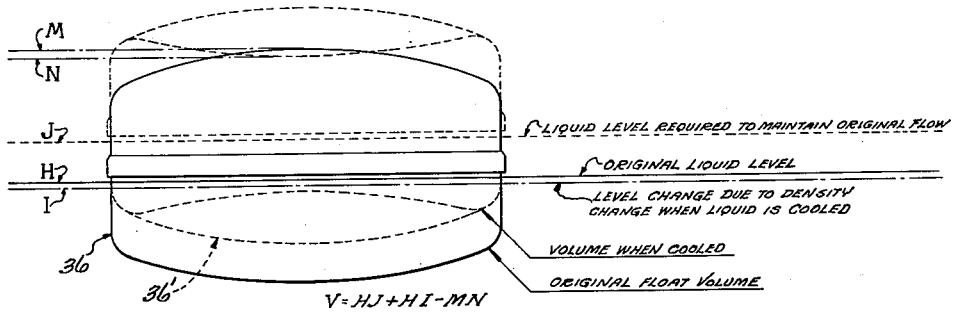
Fig. 9 is a diagram illustrating the changes required in the float volume to compensate for changes in the liquid within a given range.

Referring to the drawings by reference numerals, a casing 10 is substantially divided into a plurality of chambers 11 and 12 by a partition 13 and is substantially closed by a cover 14. A nipple 17 for connection to a source (not shown) of liquid under pressure is connected with a passage 18 in which a strainer 19 is mounted in spaced relationship, the strainer being removably held in the passage by an end closure 20, a plug 21, and other parts, which are well known in connection with the devices of the present invention.

Liquid flow into and from the passage 18 is under the control of a valve comprising a valve housing 25 in the chamber 11 and receiving an inlet valve 26. The stem of the valve 26 extends beyond the valve housing and such extended portion has secured thereon an externally threaded and flanged sleeve 27 to support a cup 28 forming a seat for a spring 29 acting between the valve housing 25 and the cup and constantly tending to lift the valve off its seat in the valve housing. A second spring 30 acts between a flange on the cup 28 and a spring seat member 31 which is held against movement on the valve stem in one direction by a flanged nut 32 threaded on the sleeve 27. The spring 30 provides an adjustable friction coupling between the sleeve 27 and the nut 32 to retain the nut against accidental movement from its manually set position.

Movement of the valve 26 is controlled by a float generally designated 36, which has mounted thereon an arm generally designated 37, the arm extending in spaced relation over a portion of the float and beyond the side wall thereof and being pivotally mounted by such extended portion on a pivot in the casing or in a bracket fixed in the casing as is well known. The peculiar construction of the float, and its special manner of operation for controlling the degree of opening of the valve 26, will be described and explained in detail hereinafter.

Liquid flows from the chamber 11 through a valve housing 41 and into an outlet passage 42 and to the point for consumption of such liquid under the control of a valve 43 (see Fig. 3). The valve 43 is preferably substantially tubular and is provided in that portion thereof extending beyond the seat therefor in the valve housing, with a slot, which in coaction with the seat forms an accurately adjustable orifice by which the discharge of the liquid through the outlet valve is controlled. The valve 43 is biased toward open position by a spring 44 acting between the casing 10 and a seat 45 for such spring fixed on the upper end of the valve 43 and engaging with the casing to prevent rotation of the valve.

The degree of opening of the valve 43 is controlled either directly and manually or by means operating responsive to a given condition, such as temperature variations at a point remote from the device. Manual operation of the valve is obtained by movement of a knob 47 mounted in and extending outside of the cover 14. The knob 47 has a stud 48 fixed therein and such stud holds a plate 49 and a cam strip 50 in predetermined position on the knob. The plate 49 forms a seat for a spring 51 acting between a flange on the cover 14 and the plate 49 to bias the knob to a predetermined degree of extension into the device and thereby bring the stud 48 into a predetermined relation with the valve 43. The curvature of the cam strip 50 is determined and may be varied by an adjusting screw 52 extending through the knob 47 and bearing on a portion of the cam strip beyond the point at which such strip is connected with the hand knob and which portion is free to flex as desired.

The cam 50 actuates a leverage which includes a pin 55 extending through the casing and adapted to be moved in one direction by remotely controlled means such as are well known. The pin 55 rests on one arm 56 of a lever pivotally mounted on the cover 14 and having a second arm 57 offset from the first arm. The lever arm 56 overlies an arm 58 of resilient material fixed at one end on the cover and engaging a screw 59 adjacent its other end, the screw 59 being mounted to swivel in the cover and allow flexure of the arm in either direction. The lever arm 57 bears a screw 60 having its end engageable with the free end of the resilient arm 58 to determine the low fire position of the outlet valve 43 when the present device is used to control the flow of liquid fuel to a burner. A leaf spring 61 extends from the free end of the arm 58 over the end of the valve 43 and is engageable with such valve under certain conditions.

When the valve is to be directly or manually controlled by way of the knob 47, such knob is turned, as for example when valve 43 is to be closed, to cause the stud 48 to bear on the spring 61 and to bring the valve first to its low fire position and then to shut the valve off entirely. When a remotely actuated device is employed to control the operation of the above described leverage in response to a condition prevailing at such remote location, pressure is exerted on the pin 55 and is transmitted through the leverage to the valve 43. The action of such leverage is adjustable by changing the relationship of the lever arm 58 and the screw 59 and by changing the relationship of the lever arm 58 and the screw 59 and by changing the relationship of the arms 57 and 58 by adjustment of the screw 60.

If the inlet valve 26 sticks, or if foreign material lodges between the valve and its seat in the housing, the increased buoyance of the float 36, as a result of a rise in the level of liquid in the chamber 11, is not sufficient to cause closure of the valve even though such liquid rises above the desired maximum level indicated. Means are accordingly provided for forcibly closing the inlet valve with a hammer blow action. Such means include an auxiliary float 66 in the chamber 12 and pivotally connected with a latch lever 67 which is pivotally mounted at 68 on the casing adjacent the inlet valve and is formed with a jaw-like shape at such pivoted end. The jaw end of the lever 67 is adapted to engage one end of a striker lever 68 which is pivoted in the casing. A spring 69 connects the striker lever 68 with the casing 10 and tends to rotate such lever clockwise about its pivot. The latch retains the striker lever in raised position until the float 66 rises above a predetermined level, whereupon movement of the float causes the latch lever 67 to release the end of the striker lever 68 and the spring 69 drives the striker lever against the end of the inlet valve with a hammer blow.

A resetting lever 73 is pivoted in the casing 10 to provide a handle, exteriorly of the casing, by which the lever may be moved to engage the striker lever and to raise the same from its contact on the inlet valve and into a position for re-engagement of the striker lever by the latch lever after the level of the oil in the chamber 12 has dropped below a predetermined position. It will be understood that re-setting of the striker lever in the latch lever is required after each forcible closure of the inlet valve.

Means are also provided for securing a constant discharge of liquid from the chamber 11 to the outlet 42 whereby a constant supply of liquid, such for example as fuel to be delivered to a pilot burner, may be obtained regardless of position of the outlet valve 43. Such means includes a passage 76 connected with a well 77 in which is slidably mounted a relatively close-fitting plug 78 with a coarse thread 79 cut into its peripheral surface. The thread communicates with a passage 80 connected with the outlet 42 on the discharge side of the valve 43. The position of the plug in the well may be varied as desired by turning an adjusting screw 81 engaging with the plug and with a nut 82 suitably mounted in the casing. The plug 79 is in effect a capillary passage between the passages 76 and 80, and flow through such capillary may be varied by lifting the plug to bring a portion of the thread thereon above the entrance to the passage 80, thus changing the effective length of the capillary passage.

In the normal operation of the device, the outlet valve 43 is set either by operation of the hand knob 47 or by action of the leverage 55—61, inclusive, by known means responsive to a given condition such as temperature, to provide for the discharge of a predetermined quantity of liquid from the device. As the liquid is discharged, the liquid level in chamber 11 drops and lowers the float 36 which thus allows the intake valve 26 to open. If the valve 26 fails to open and close responsive to the movement of the float 36, the level of liquid in chamber 11 rises and overtops the partition 13 to flow into the chamber 12. The auxiliary float 66 then rises and the latch lever 67 eventually releases the striker lever 68 which drops and forcibly closes the valve 26. Thereafter the reset lever must be actuated to re-lift the striker lever 68 which engages with the latch lever 67 if the liquid level in the chamber 12 has dropped to a predetermined value. Thereupon the device can resume normal operation until the valve 26 again fails to respond to movement of the float 36.

The float 36 is specially constructed to provide automatic compensation for variations in liquid flow through the device resulting from variations either in the temperature of the liquid itself or in the temperature surrounding the device. The float is made from two half shells 88 and 89 with the half shell 89 seating in the half shell 88, the two half shells being permanently joined, as by solder 90, to form a hollow body of substantially cylindrical shape. The ends of both of the float half shells are formed with circular corrugations, as indicated at 91, which extend over an annular area commencing a slight distance from the edge formed by the juncture of the float ends and the side wall and terminating a relatively large distance from the axis of the float. The size of the annular area is dependent both on the charge of the float and the amount of buoyancy compensation required. A substantially circular area 92 about the center of each float end is left uncorrugated to provide space for attachment of the float arm 37 and to secure flexure of the float ends as will appear hereinafter.

The float arm 37 is fixed at one end on the uncorrugated central portion 92 of that float end which is uppermost when the float is in use and the arm extends in spaced relation over the corrugations 91 and beyond the side wall of the float where the arm is formed with ears 93 receiving a pivot 94 fixed in a bracket in the casing 10. The free end of the arm 37 is bifurcated to form two legs 95 with rounded ends acting on the spring seat 31 and engageable with the sides of the flange on the nut 32 whereby float movement is transmitted to the valve 26. One ear 93 is also formed with a lug 96 extending at right angles to such ear and engageable with casing bracket for the purpose of preventing damage to the float corrugations in handling and shipping.

Both ends of the float 88, 89 are preferably corrugated but it will be understood that only one float end may be corrugated. Such corrugations are non-uniform to produce a varying rate of float end flexure. The corrugations severally comprise two curves such as A—B and B—C, alternately taken from centers on the inside and the outside of the float end as indicated by radii HI, and such radii progressively decrease from larger values, adjacent the juncture of the float side wall and the end, to smaller values adjacent the float end area 92. Such decrease in radii is however different for the curves taken from centers on the outside and the inside of the float end. The widths of the corrugations measured on a radius of the float end, as indicated by distance N for example, are preferably equal within manufacturing tolerances. As most clearly shown in Fig. 8, the height of the corrugation high points above the plane of area 92 and of the depth of the corrugation low points below the plane of area 92 decrease from such area toward the float end and side wall juncture. Thus distance I equals distance P and distance R equals distance S but O, P are less than R, S.

The float is supplied with a small quantity of a suitable fluid, such as acetone, which is readily vaporized in the range of temperatures within which the device is to operate. The expansible medium is chosen to give a temperature-vapor pressure curve so related to the viscosity curve of the liquid being controlled that the vapor pressure acting on the flexible float ends produces flexure thereof (at a variable rate) and the composite of the two curves changes the displacement of the float at a rate compensating for changes in the liquid level due to variation of temperature.

Fig. 9 diagrammatically, and on an exaggerated scale, shows the change ocurring in the liquid level as a result of a decrease in liquid temperature, and shows the level to which the liquid must be raised to maintain a constant flow at the higher viscosity due to the temperature decrease. Such figure also shows the decrease in float volume (buoyance) required to permit such opening of the inlet valve as to obtain the necessary higher liquid level. The original liquid level is indicated by the solid line H, and the original float shape and volume are indicated by the solid line representation of the float 36. The dot-dash line I indicates the contraction in the liquid volume due to decrease in temperature and hence the change in liquid level for a given amount of cooling. The dot line J indicates the liquid level required to maintain the desired value of flow at the higher viscosity, and the dot line float 36' shows the decreased volume and hence changed shape of the float required to compensate for the various changes due to the lower temperature. Lines M and N respectively indicate the change in the average position of the float ends at the original and at the lower temperatures assumed in the diagram. The change in float volume V required to compensate for the higher viscosity is the distance H—J plus the distance H—I minus the distance M—N.

Figure 10:
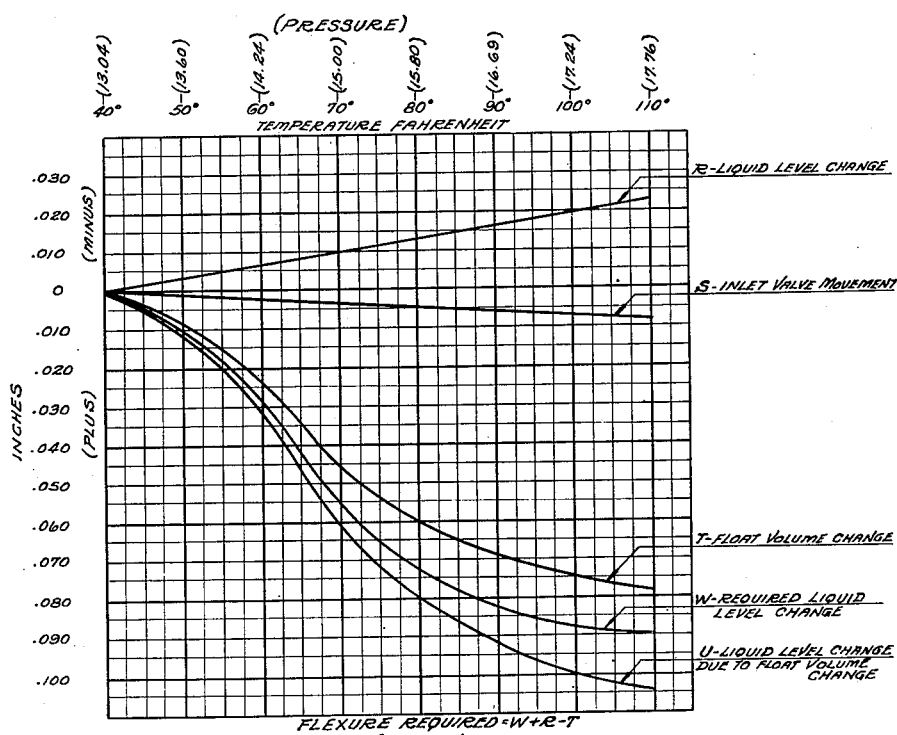
Fig. 10 shows curves illustrating the relationships of the variable values requiring consideration in manufacture of the present device.

Two sets of curves are shown in Fig. 10 utilizing the same temperature and "inch" coordinate axes and graphically indicating the varying values to be taken into account in determining the required volume change and hence amount of flexure required of the float ends. The curves are all taken assuming the zero point on the temperature scale as being 40° F. which yields an internal float vapor pressure of 13.04 pounds per square inch (the pressure values being shown adjacent each temperature value and in parentheses). The "inch" scale is shown in thousandths of inches movement at various temperatures, and the pressure values are shown in pounds per square inch absolute. The line R shows the liquid level change due to density variations upon change in temperature, while the additional inlet valve movement required to secure the predetermined flow at the higher density is shown in curve S. Curve T shows the float volume change occurring at the various temperatures and pressures and hence indicates the movement required of the ends of the float for each change in temperature. (The curve T is reflected on the temperature axis to obtain positive values for comparison with the succeeding curves.) The curve U is the liquid level change required to compensate for the float volume change at the various temperatures and is obtained by multiplying the curve T values by a constant (1.33). Curve W shows the changes required in the liquid level at the various temperatures to maintain the predetermined values of liquid flow and is obtained by modifying the curve U by the values of the line R and the curve S. Hence the actual flexure required of the float ends at various temperatures is represented by the value of curve W plus the corresponding value of line R and minus the corresponding value of curve T. Such curve values correspond respectively to the distances H—J, H—I, and M—N.

It will be seen from the above description that the present device provides a float varying the hydraulic head of a liquid on an orifice responsive to temperature and hence to viscosity and density changes of the liquid to be controlled. The buoyancy of the float is varied automatically, thus producing a float action which can be made to compensate exactly for changes in the liquid viscosity. The float controls the degree of opening of an intake valve which is forcibly closed, if the float is unable to close the valve, by means responsive to the rise of the liquid level above a predetermined value. A discharge orifice is varied by a condition to be controlled, either adjacent the device or remotely thereto, and which requires the passage of the same quantity of liquid for a given condition and regardless of the temperature of the liquid. Variations in liquid temperature, which would otherwise vary the quantity of liquid passing through a given setting of the orifice in a given period of time, are therefore compensated by changes in the static hydraulic head on the valve, so that the quantity of liquid passed by the orifice at any given setting remains constant.

Although but one embodiment of the present invention has been illustrated and described it will be apparent to those skilled in the art that various changes and modifications may be made therein without departing from the spirit of the invention or from the scope of the appended claims.

I claim:
1. In a fuel control device having an inlet valve actuated by a float to maintain a desired oil level in a casing having an outlet adapted for connection to a burner, the float comprising a generally cylindrical hollow body, the ends of which comprise flexible diaphragms structurally formed to define a predetermined variable rate of flexure in response to pressure variations within the float, a vaporizable charge in said float for varying at a predetermined rate the pressure in the float in response to temperature changes, the rate of flexure of said diaphragms being correlated with the rate of variation in the viscosity of the oil and with the rate of variation in the vapor pressure of said charge in response to changes in temperature respectively, so that the resulting changes in the displacement of the float will vary the level of the oil within the casing to provide a substantially constant rate of oil flow from the casing outlet regardless of variations in the viscosity of the oil due to temperature change.

2. The apparatus described in claim 1 wherein the diaphragms are structurally formed with plural corrugations having different degrees of resistance to flexure and providing for the respective diaphragms the overall predetermined variable rate of flexure in response to pressure variations within the float.

3. The apparatus described in claim 1 wherein the diaphragms are structurally formed to provide plural, concentric areas having different degrees of resistance to flexure and providing for the respective diaphragms the overall predetermined variable rate of flexure in response to pressure variations within the float.

4. The apparatus described in claim 1 wherein the diaphragms are structurally formed with plural, concentric corrugations the crests of which are of different heights and curvatures to provide therein different degrees of resistance to flexure, said corrugations together providing the predetermined variable rate of flexure in the respective diaphragms in response to pressure variations within the float.

5. The structure described in claim 4 wherein the radii of curvature of the crests of the corrugations decrease from the edge of the diaphragms toward the center thereof and wherein the height of said crests decreases from the center towards the edge of the diaphragms.

WILLIAM A. BIERMANN.

REFERENCES CITED

The following references are of record in the file of this patent:

UNITED STATES PATENTS

| Number | Name | Date |
| --- | --- | --- |
| 1,664,840 | Wermine | Apr. 3, 1928 |
| 1,712,460 | Purdy | May 7, 1929 |
| 1,847,053 | Browne | Feb. 23, 1932 |
| 1,869,282 | Schwartz | July 26, 1932 |
| 2,247,930 | Turner | July 1, 1941 |
| 2,289,218 | Simpson | July 7, 1942 |
| 2,336,730 | Hayter | Dec. 14, 1943 |
| 2,338,319 | DeLancey | Jan. 4, 1944 |
| 2,355,870 | Johnson | Aug. 15, 1944 |
| 2,427,059 | Landon | Sept. 9, 1947 |